Figure 1:
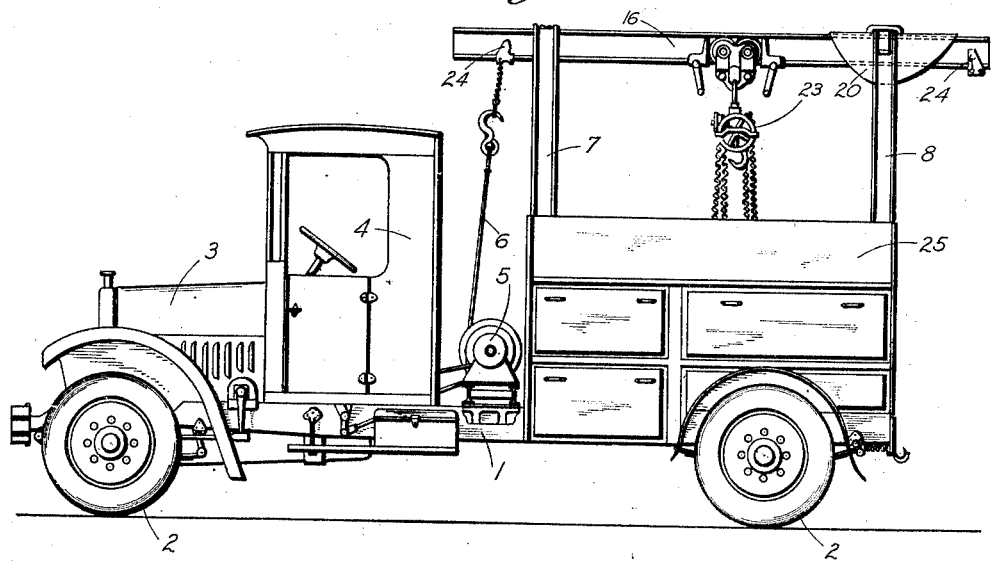

Dec. 10, 1929.   H. H. SAKER   1,738,926
TRUSSED STRUCTURE
Filed March 21, 1927   2 Sheets-Sheet 1

INVENTOR
HAROLD H. SAKER
BY
Rickey & Watts
ATTORNEYS

Dec. 10, 1929.  H. H. SAKER  1,738,926
TRUSSED STRUCTURE
Filed March 21, 1927  2 Sheets-Sheet 2
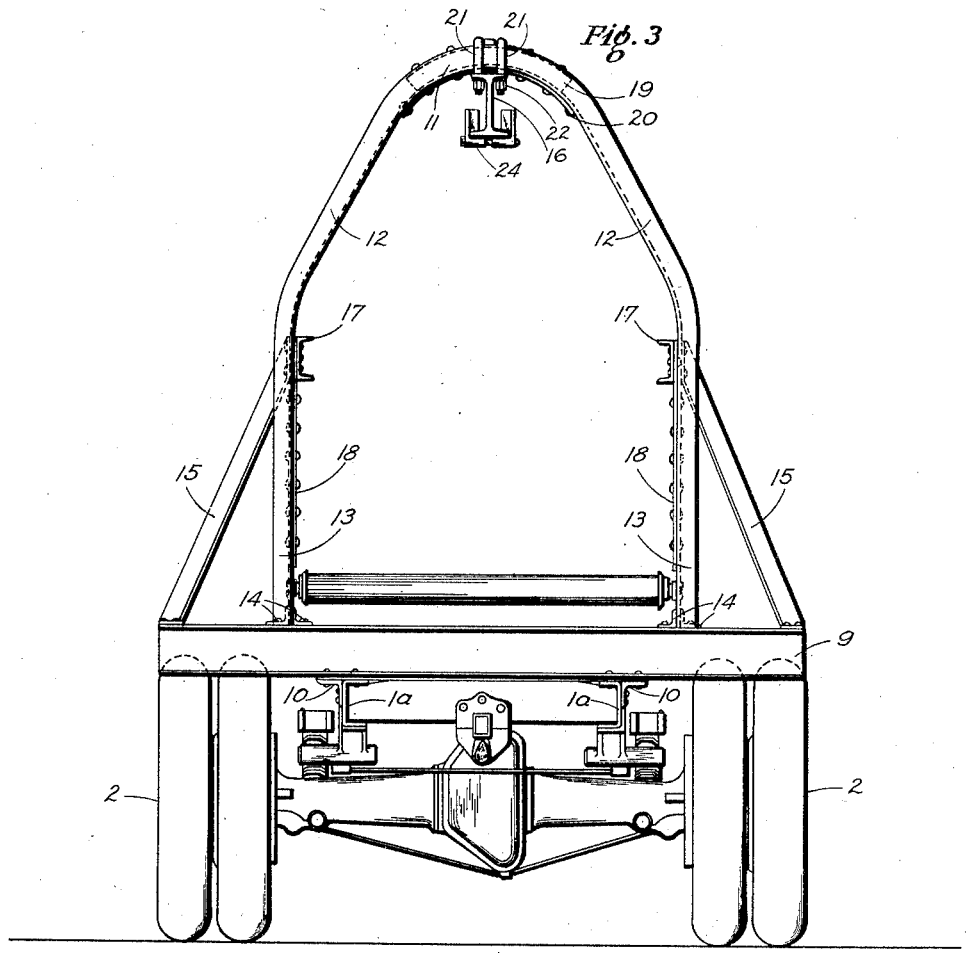
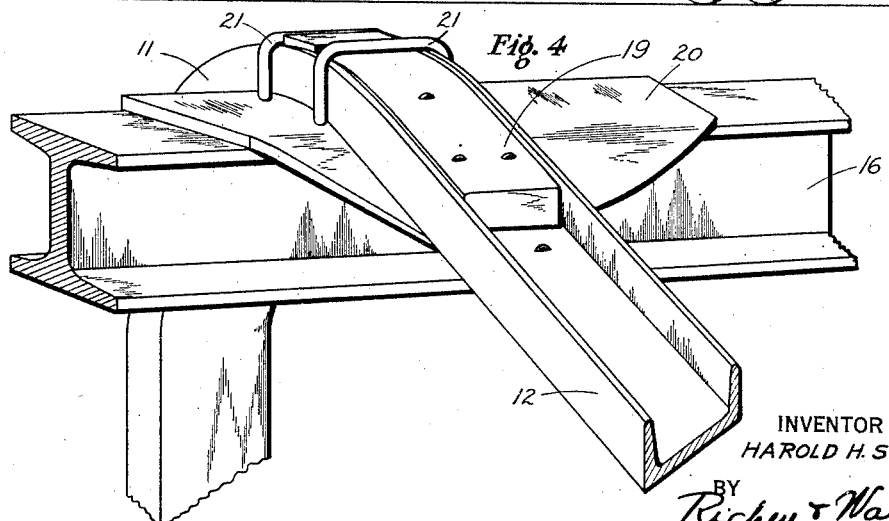
INVENTOR
HAROLD H. SAKER
BY Richey & Watts
ATTORNEYS Patented Dec. 10, 1929

1,738,926

UNITED STATES PATENT OFFICE

HAROLD H. SAKER, OF CLEVELAND, OHIO

TRUSSED STRUCTURE

Application filed March 21, 1927. Serial No. 177,029.

This invention relates to vehicles which are provided with elevating and/or conveying means and is particularly applicable to automotive trucks such as are used in wrecking and repair work and which must be capable of lifting and of supporting and towing large weights.

Heretofore wrecking cars have been devised in which some form of crane or hoist was provided by which one end of a wrecked automobile could be raised from the ground and supported so that the car could be towed along the road partly supported by the crane or hoist and partly by two of its own wheels.
Such a device is frequently necessary as where an automobile breaks an axle or similarly renders one pair of wheels inoperative. As the crane or hoist must overhang the rear of the wrecking car and when in this position must not only be capable of supporting the downward load imposed upon it by the car being towed, but must also resist severe lateral strain as, for instance, when going around a corner or along a crowned road, particularly firm lateral bracing of the structure has been necessary, as well as firm longitudinal bracing. It has, therefore, been common to construct such crane supporting structures of a plurality of substantially straight struts converging to the point from which the hoist is suspended, and frequently supplemented by stays. Such structures possess numerous disadvantages, in that they were awkward in construction, the hoist could not be moved as it must be carried at the point of juncture of the struts, and the structure obstructed the entire rear end of the wrecking car, thus rendering it substantially useless for any other purpose than that of a light portable crane By application of my invention I am able to provide a structure which will conveniently support a hoist or the like on an automotive vehicle, which possesses great strength both laterally and longitudinally, in which the hoist may be moved longitudinally of the vehicle, and which does not obstruct the interior of the vehicle but permits the use of a large unobstructed space for the storage of repair parts, tools and the like, which may also be delivered to and from this space by the hoist that is used for raising damaged vehicles.

The invention will be better understood from the description of one practical embodiment thereof illustrated in the accompanying drawings in which Fig. 1 is a side elevation of a truck provided with apparatus embodying the invention,

Figure 2:
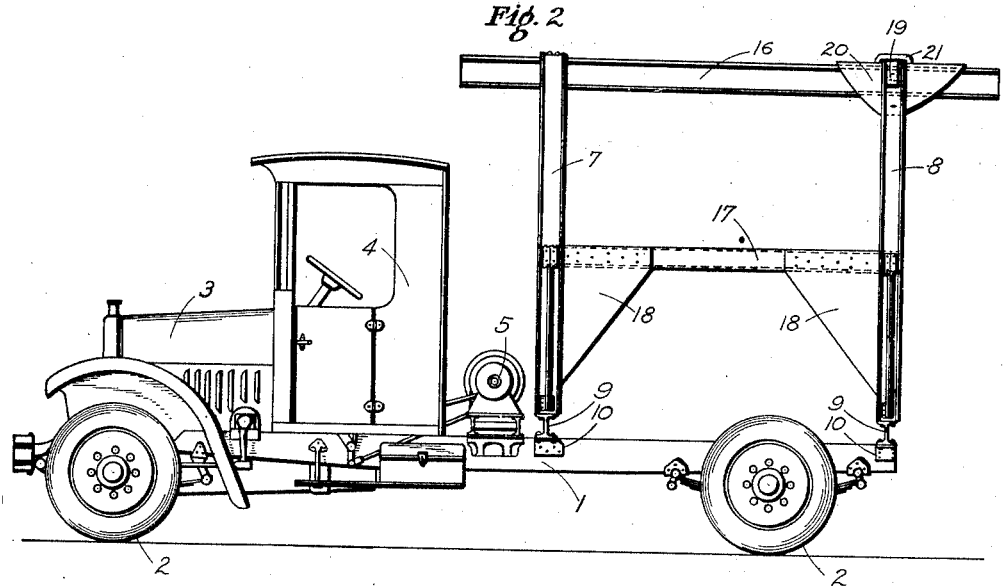

Fig. 2 is a similar view showing the rear part stripped of tool boxes, flooring and the like, to expose the frame of the super-structure, Fig. 3 is a rear elevation of the truck as shown in Fig. 2, and Fig. 4 is a perspective on an enlarged scale of a fragmentary section of the top of the super-structure.

The vehicle is shown as comprising a frame 1, supported upon wheels 2, and having at its forward end a power plant 3 and cab 4, all of any well known or desired construction. Mounted upon the frame, directly behind the cab is a winch 5, by which a cable 6 may be reeled in.

Supported upon the frame 1 immediately behind the winch is a transversely extending vertically disposed truss member 7 and at the extreme rear end of the frame is a similar truss member 8. These truss members are each, as best illustrated in Fig. 3, supported upon a rigid beam 9, extending transversely across the top of the side members 1ᵃ of the vehicle frame and secured thereto as by brackets 10 and rivets or the like.

Above the beam is a bow-shaped member comprising an upper curved central section 11, downwardly diverging straight sections 12 and downwardly extending substantially vertical or queen post sections 13, the lower ends of which are secured to the upper surface of the beam 9. The parts 11, 12 and 13 are all formed integrally by bending a single channel member to form the curved section 11 at its middle, and the curves between sections 12 and 13 intermediate this middle section and its ends. The ends of the bowed member are connected to the beam by brackets 14 and rivets, as shown, or in any other suitable manner, and at an appreciable distance from the end of the beam. Preferably, the space between the sections 13 is about as much as the distance between the wheels of the vehicle, and the ends of the beam 9 extend outwardly to the outer edge of the wheels or the fenders.

Extending upwardly from the outer end of the beam to the upper end of each section 13 is a brace 15, which forms with the section 13 and the end portion of beam 9, a bracing triangle and so positively locates the lower end of section 12. The sections 12, joined by section 11, having their lower ends positively positioned, form in effect another bracing triangle which in turn positively locates the center of section 11. In this manner the desired lateral strength of the structure is secured.

The two trusses are joined by a beam 16 secured to the central part of sections 11 and by two beams 17 joining the upper ends of sections 13 at substantially their point of attachment with the upper ends of struts 15. Large substantially triangular gusset plates 18 are riveted to the beams 17 and to the sections 13 and provide, in effect, diagonal bracing which gives the structure the desired longitudinal strength. The frame beams 1, sections 13, beams 17, and gusset plates 18 form two longitudinally extending vertical panels, braced effectively against deformation, and firmly hold the bows upright.

Fig. 4 illustrates the details and the connection between section 11 of the rear truss and beam 16. The bow is provided at this point with a curved filler block 19 which fills the channel thereof and fits against the web thereof throughout substantially the extent of this curved portion. Between the beam 16 and section 11 is a large curved gusset plate 20 secured by rivets through section 11 and the filler block 19. Two U-bolts 21 span the section 11 and extend through apertures in the gusset plate and the upper flange of beam 16, holding beam 16 tightly against the gusset plate by means of nuts 22.

The beam 16 not only forms part of the super-structure but serves as a track along which the chain hoist 23 may move, the motion of this hoist being limited adjacent the ends of the beam by stops 24. The connection between the beams and the truss members, above described, is very strong for supporting loads imposed upon the crane or the hoist and also to resist any tendency of parts of the frame to twist relative to each other.

Boxes or the like 25 may be carried on the outer ends of the beams 9 and completely conceal the struts 13 and braces 15, while furnishing a large storage space for tools, parts and the like.

It will thus be seen that I have provided a superstructure which is very strong, both laterally and longitudinally in which the hoist may be moved from end to end and caused to overhang the rear of the vehicle, the super-structure leaving entirely unobstructed a large space therewithin in which articles may be conveniently placed and to and from which they may be delivered by the hoist, the entire structure being simple and neat in construction and appearance.

While I have described this illustrated embodiment of my invention with some particularity, this is shown by way of illustration only, and I do not limit myself to the details shown and described but claim as my invention all embodiments coming within the scope of the subjoined claims.

I claim:

1. A trussed structure comprising two longitudinally extending frame members, two transversely extending beams carried thereby, a bow-shaped member carried by each beam and comprising a curved-loop at the top, downwardly diverging sides, and vertically extending ends terminating upon said beam near its ends, diagonal braces from said beams to the upper part of said vertical sections of the bow, longitudinally extending beams connecting the corresponding sides of the bows adjacent the upper part of the vertical sections thereof, a central longitudinally extending beam carried by the tops of the bows, and gusset plates between said first mentioned longitudinally extending beams and said bows.

2. A hoist support comprising two inverted spaced, bow-shaped metal channed members, a beam suspended from the bends of the members, the connection at one of said members comprising U bolts looping the member and passing through a flange in the beam, a filler block within the channel underlying the U-bolts and extending substantially the length of the bend, and a gusset plate between the beam and member riveted to the member and apertured for the passage of the U-bolts.

In testimony whereof I hereunto affix my signature.

HAROLD H. SAKER.